(12) United States Patent
Yang et al.

(10) Patent No.: US 8,611,742 B2
(45) Date of Patent: Dec. 17, 2013

(54) WAVELENGTH SWITCH SYSTEM USING ANGLE MULTIPLEXING OPTICS

(75) Inventors: Long Yang, Union City, CA (US); Jeffrey E. Ehrlich, San Jose, CA (US); Massimo Martinelli, Santa Clara, CA (US)

(73) Assignee: Capella Photonics, Inc., San Jose, CA (US)

( * ) Notice: Subject to any disclaimer, the term of this patent is extended or adjusted under 35 U.S.C. 154(b) by 229 days.

(21) Appl. No.: 13/048,773

(22) Filed: Mar. 15, 2011

(65) Prior Publication Data
US 2012/0237218 A1 Sep. 20, 2012

(51) Int. Cl.
*H04B 10/02* (2011.01)
*G02B 6/26* (2006.01)
*G01B 9/02* (2006.01)

(52) U.S. Cl.
USPC ............ 398/48; 398/43; 398/45; 385/16; 385/18; 385/24

(58) Field of Classification Search
USPC .............................. 398/48, 45, 43
See application file for complete search history.

(56) References Cited

U.S. PATENT DOCUMENTS

| | | | |
|---|---|---|---|
| 6,782,205 B2 | 8/2004 | Trisnadi et al. | |
| 6,798,948 B2 | 9/2004 | Delisle et al. | |
| RE39,515 E | 3/2007 | Garrett et al. | |
| 7,756,368 B2 | 7/2010 | Garrett et al. | |
| 2006/0159395 A1* | 7/2006 | Hnatiw et al. | 385/37 |
| 2007/0217735 A1* | 9/2007 | Cai et al. | 385/16 |
| 2009/0257464 A1* | 10/2009 | Dantus et al. | 372/25 |
| 2009/0304328 A1* | 12/2009 | Presley et al. | 385/16 |

OTHER PUBLICATIONS

International Search Report mailed date Jun. 8, 2012 issued for International PCT Application No. PCT/ US2012/028189.

* cited by examiner

*Primary Examiner* — Shi K Li
*Assistant Examiner* — Oommen Jacob
(74) *Attorney, Agent, or Firm* — Joshua D. Isenberg; JDI Patent

(57) ABSTRACT

Optical switches can include collimator elements that accommodate two or more optical ports. This increases the number of ports the switch can accommodate without having to increase the size of other optical components within the switch. Separate deflectors can be used to accommodate optical signals from two different groups of ports. In some embodiments cross-coupling of signals between the two groups can be accomplished through use of re-direction optics.

10 Claims, 11 Drawing Sheets

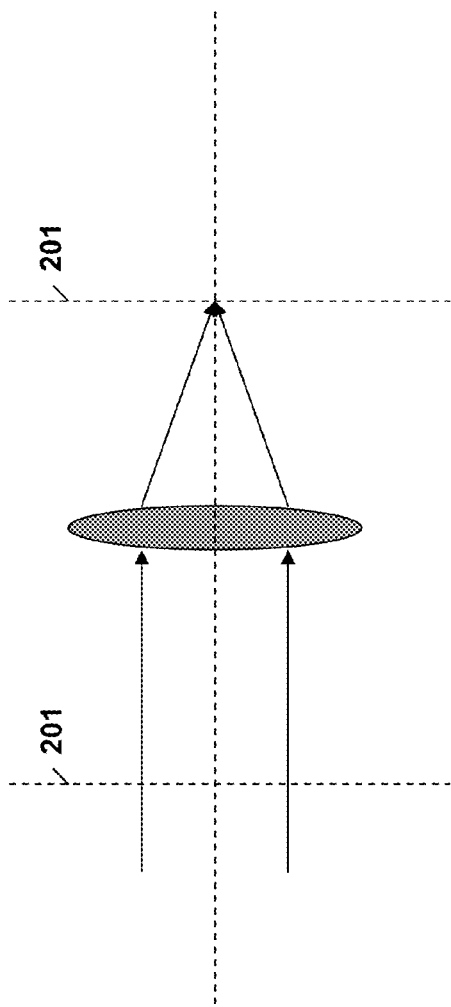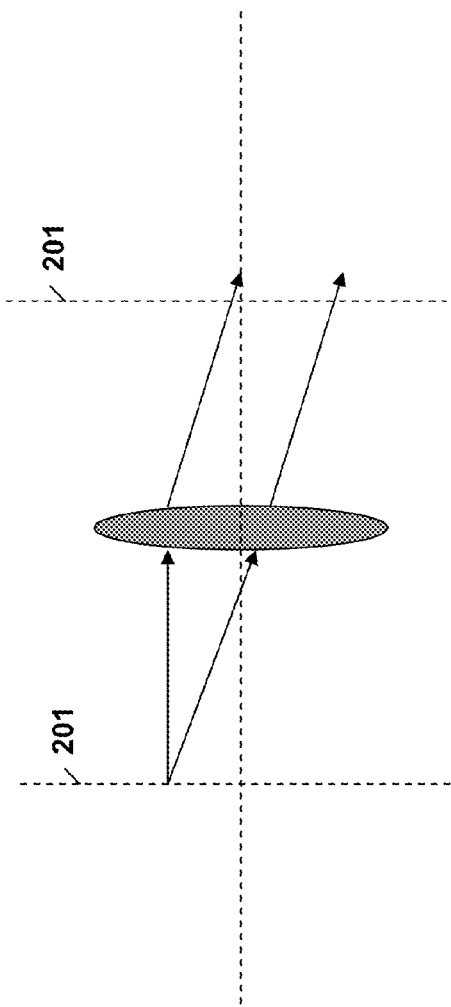

WAVELENGTH SWITCH SYSTEM USING ANGLE MULTIPLEXING OPTICS

FIELD OF INVENTION

Embodiments of the invention relate to optical switching systems employing angle multiplexing optics.

BACKGROUND

With the substantial growth in demand for internet bandwidth, internet traffic requirements have become quite unpredictable. In adapting to this challenge, many networks have evolved to use reconfigurable optical add drop modules (ROADM) at nodes in ring and mesh networks. These networks require the use of wavelength switch systems (WSS). Traffic from point A to point B can be routed dynamically through the use of these networks. To enable routing flexibility, these systems employ many usable wavelengths and channels. When needed, a new channel can be deployed in response to an increased bandwidth requirement, or alternatively a channel can be dropped in response to congestion or disruption of part of the network. The evolution of WSS in response to these growing needs involve two basic architectures: colored WSS and colorless WSS.

The colored WSS will switch a specific wavelength to an associated output fiber. The colored WSS was developed using arrayed waveguide gratings (AWG) as a wavelength multiplexer/de-multiplexer element. The drawback of the colored WSS is that it fails to provide flexibility because fixed or specific wavelengths are needed in order for the switching process to occur, even though tunable lasers are widely available. The wavelength is fixed due to the physical association between the wavelength and a particular output fiber. This limits the ability of a colored WSS to act as an add/drop module because fixed or specified wavelengths are necessary in order to perform the add/drop functions. Using a colored WSS creates an inflexible ROADM and network. The wavelength provisions or routing determinations are made when the WSS is installed, which is a manual rather than dynamic operation.

The colorless WSS, on the other hand, provides the freedom of choosing any wavelength transmission dynamically, provided that tunable lasers are connected to the WSS. However, each tunable laser can only transmit data via one channel of the WSS. If more wavelengths are needed from a node, more tunable lasers will need to be connected to the WSS. In order to connect more tunable lasers to the WSS, more WSS ports are needed. For this reason, it is desirable to have a WSS with a higher port count, or an optical architecture configured to transmit a greater number of multi-channel optical signals using the existing number of ports.

There is a need in the art of optical switching for an optical switch architecture that can increase the flexibility of a wavelength switch system while retaining the majority of its design aspects.

It is within this context that embodiments of the present invention arise.

BRIEF DESCRIPTION OF THE DRAWINGS

FIG. 2A is a schematic diagram illustrating a basic foundation of optical design.

FIG. 2B is a schematic diagram illustrating another basic foundation of optical design.

DESCRIPTION OF THE SPECIFIC EMBODIMENTS

Embodiments of the present invention utilize an optical architecture that can increase the flexibility of a wavelength switch system while retaining the majority of its design aspects.

Introduction

Figure 1A:
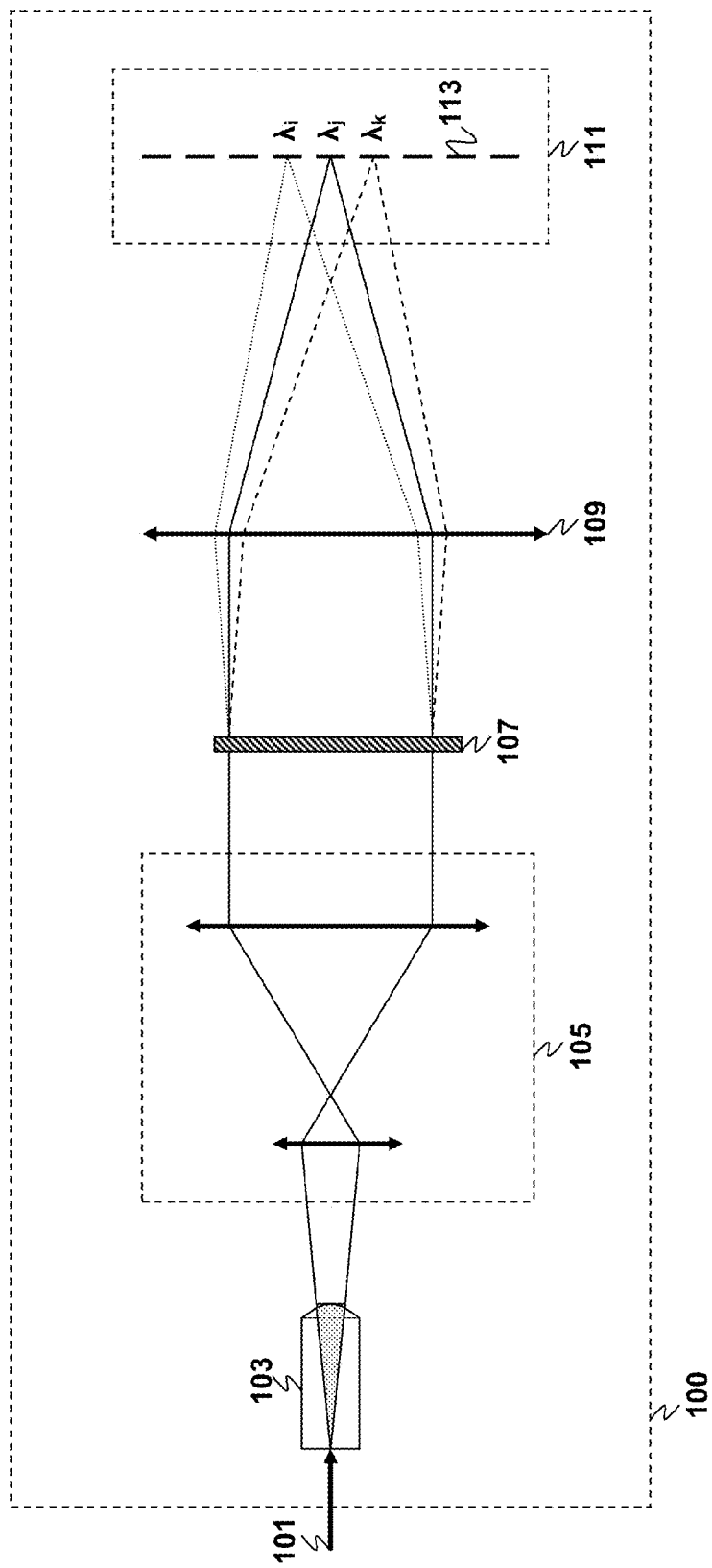
FIG. 1A is a top-view schematic diagram illustrating an example of a wavelength switch system according to the prior art.
Figure 1B:
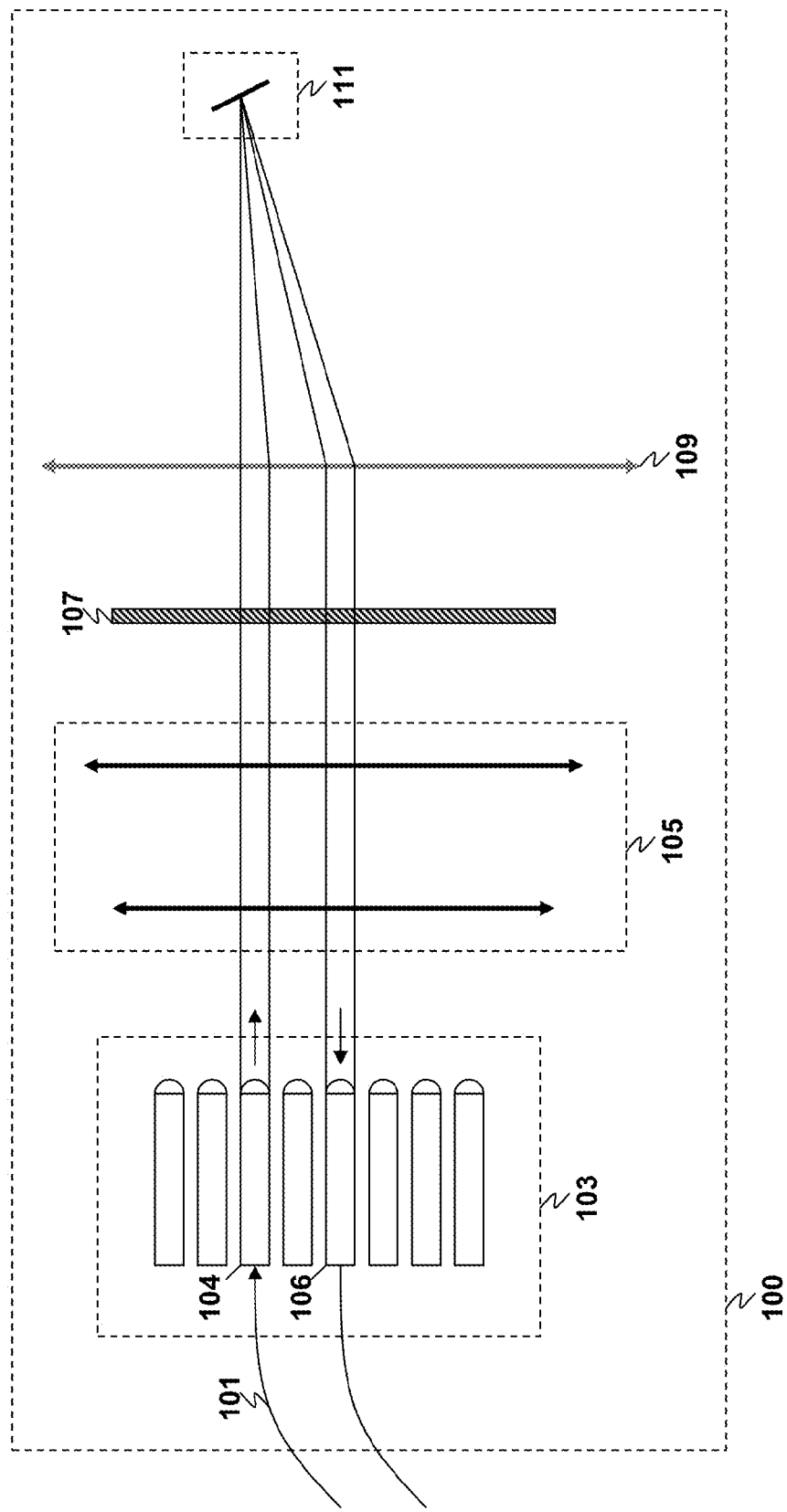
FIG. 1B is a cross-sectional view schematic diagram illustrating an example of a wavelength switch system according to the prior art

To illustrate the advantages of the inventive wavelength selective switch (WSS) architecture, it is useful to understand the details of a conventional WSS. FIG. 1A-B illustrate an example of a wavelength switch system (WSS) according to the prior art. FIG. 1A illustrates a top-view of the WSS, while FIG. 1B illustrates a cross-sectional view of the WSS. The WSS 100 includes a fiber collimator array 103, a set of relay optics 105, a wavelength separator 107, focusing optics 109, and an array of channel deflective elements 111. The WSS 100 is configured to receive one or more multi-channel optical signals 101 and direct those constituent channels to their respective output ports 106. Each multi-channel optical signal 101 is produced by multiplexing various wavelengths into a single high-speed signal.

The fiber collimator array 103 is comprised of multiple input ports 104 and output ports 106. Each input port 104 is configured to receive a single multi-channel optical signal 101 and direct that multi-channel optical signal 101 towards a set of relay optics 105. For purposes of illustration, only a single multi-channel optical signal 101 will pass through the WSS 101, but it is important to note that a WSS 100 may be configured to re-direct several multi-channel optical signals simultaneously depending on the number of input and output ports available.

The relay optics 105 are configured to convert the multi-channel optical signal 101 into a spectral beam and direct that spectral beam towards a wavelength separator 107. The relay optics 105 may be implemented using an anamorphic beam expander. The wavelength separator 107 is configured to then separate the spectral beam corresponding to the multi-channel optical signal 101 into its constituent spectral channels (i.e., wavelengths), and pass those spectral channels towards a set of focusing optics 109. By way of example, and not by way of limitation, the wavelength separator 107 may be realized with an interference filter, polarizing filter, arrayed waveguide grating, prism, etc.

The focusing optics 109 may be configured to receive the individual spectral channels and direct them towards the array of channel deflective elements 111. Each spectral channel will be directed towards a corresponding channel deflective element 113 depending on the configuration of the WSS 100. Depending on the nature of the switching involved, each channel deflective element 113 in the array 111 may be positioned to direct different spectral channels towards different output ports 106. It is important to note that it is possible to direct two different spectral channels to the same output port 106 if their deflective elements 113 are set to perform in that manner. The channel deflective elements 113 may be realized with microelectromechanical system (MEMS) mirrors, bi-stable liquid crystals, UV curable optical mediums, photorefractive holographic gratings, etc.

It is noted that the number of channels in a switch of the type shown in FIGS. 1A-1B depends on the number of ports in the collimator array 103. As used herein the term "port" refers to an optical path configured to couple optical signals into or out of an optical switch. In a WSS of conventional architecture, such as that depicted in FIGS. 1A-1B, there is one port, e.g., one optical path, per collimator. Increasing the number of ports in a switch of the type shown in FIGS. 1A-1B therefore requires increasing the number of collimators in the array. This, in turn requires an increase in the size of the collimator array 103, relay optics 105, the wavelength separator 107 and the angular range of the deflective elements 111.

Before describing any embodiments of the present invention, some basic foundations of optical design must be laid. As illustrated in FIG. 2, between two focal points a lens 203 is said to perform a Fourier transform between the spaces of angle and position at the front and back focal planes. To better illustrate this concept, please refer to FIGS. 2A and B. In FIG. 2A, two parallel rays coming from the left side of the lens 203 will pass through the same point at the focal plane 201' on the right side of the lens. Similarly, in FIG. 2B, two rays coming from the same point at the focal plane 201 on the left side of the lens will propagate in the same direction on the right side of the lens regardless of their initial angular direction.

Thus, in order to perform optical switching, a given optical design has to match its optical components with its associated space. In FIGS. 1A-1B, the multi-channel optical signal is dispersed into constituent channels (i.e., wavelengths) of different angles by the wavelength separator. The channels will thus meet the focusing optics at different positions, which will then direct the channels to different deflective elements. The deflective elements will be oriented in different positions to perform angle modulation on the constituent channels, which will alter the positions at which the channels meet the wavelength separator and ultimately determine which output port a given channel is directed towards.

The cost of optical components including relay optics, gratings, and lenses as well as the costs associated with alignment of the optical system are quite high. As such it is quite desirable to maximize the capacity of the optical setup. The architecture of the switch depicted in FIGS. 1A-1B dictates that in order to increase the number of multi-channel optical signals allowed for switching in a given WSS, the number of ports must be increased. This is because each port may only be configured to receive and transmit a single multi-channel optical signal. Increasing the port count will naturally result in an increase in optical components either vertically or horizontally.

In the vertical dimension, the size of the fiber collimator array will increase to compensate for the increased port count. The result would be an increase in the height of the overall optical system (e.g., relay optics, wavelength separator, focusing optics), which would significantly affect costs. Additionally, an increase in the vertical dimension would also create a need for an increase in the angular range of the individual channel deflective elements, which may not be easily realized.

In the horizontal dimension, the collimator array may be expanded to a size of 2×N or M×N in order to compensate for the increased port count. This would require a significant increase in the size as well as the numerical aperture (NA) of the lens system associated with the fiber collimator array, which is quite difficult to implement when attempting to achieve low aberration for low insertion loss. Additionally, the surface area of the relay optics, wavelength separator, and focusing optics would need to be increased, adding to the overall cost and size of the WSS.

Angle Multiplexing WSS

In order to minimize costs associated with increasing the number of multi-channel optical signals being switched, embodiments of the present invention seek to avoid increasing the size of the optical system while increasing the number of ports. Rather than increasing the number of collimators and expanding the optical system vertically or horizontally, embodiments of the present invention increase the allowable number of multi-channel optical signals being switched by reconfiguring each collimator to receive and transmit more than one multi-channel optical signal at a time. In effect, each collimator can be configured to accommodate two or more different ports. This can be done using the same relay optics, wavelength separator, and focusing lens by applying the basic foundations of optical design discussed above (e.g., two optical signals entering the grating at the same point, but different angles).

Figure 3A:
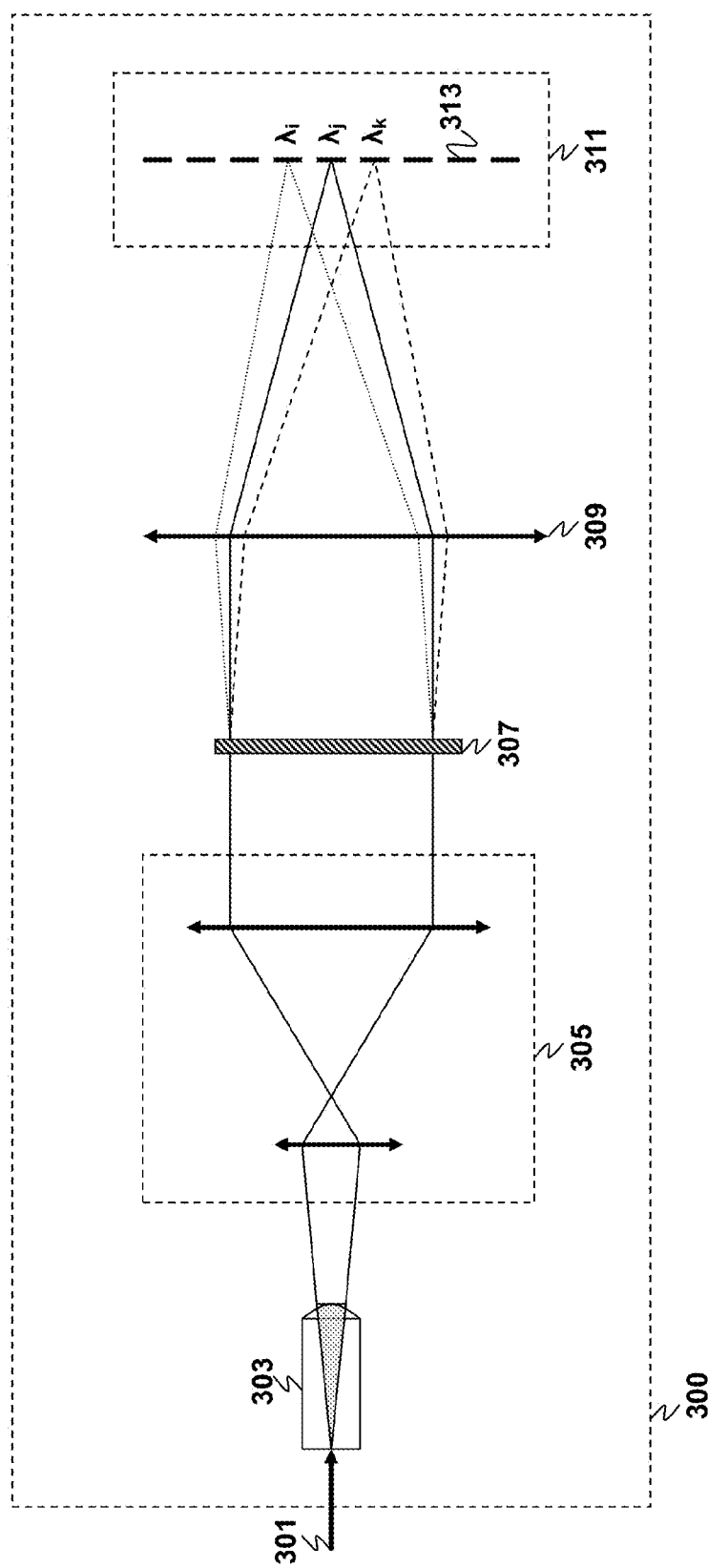
FIG. 3A is a top-view schematic diagram illustrating an example of a wavelength switch system employing angle-multiplexing according to an embodiment of the present invention.
Figure 3B:
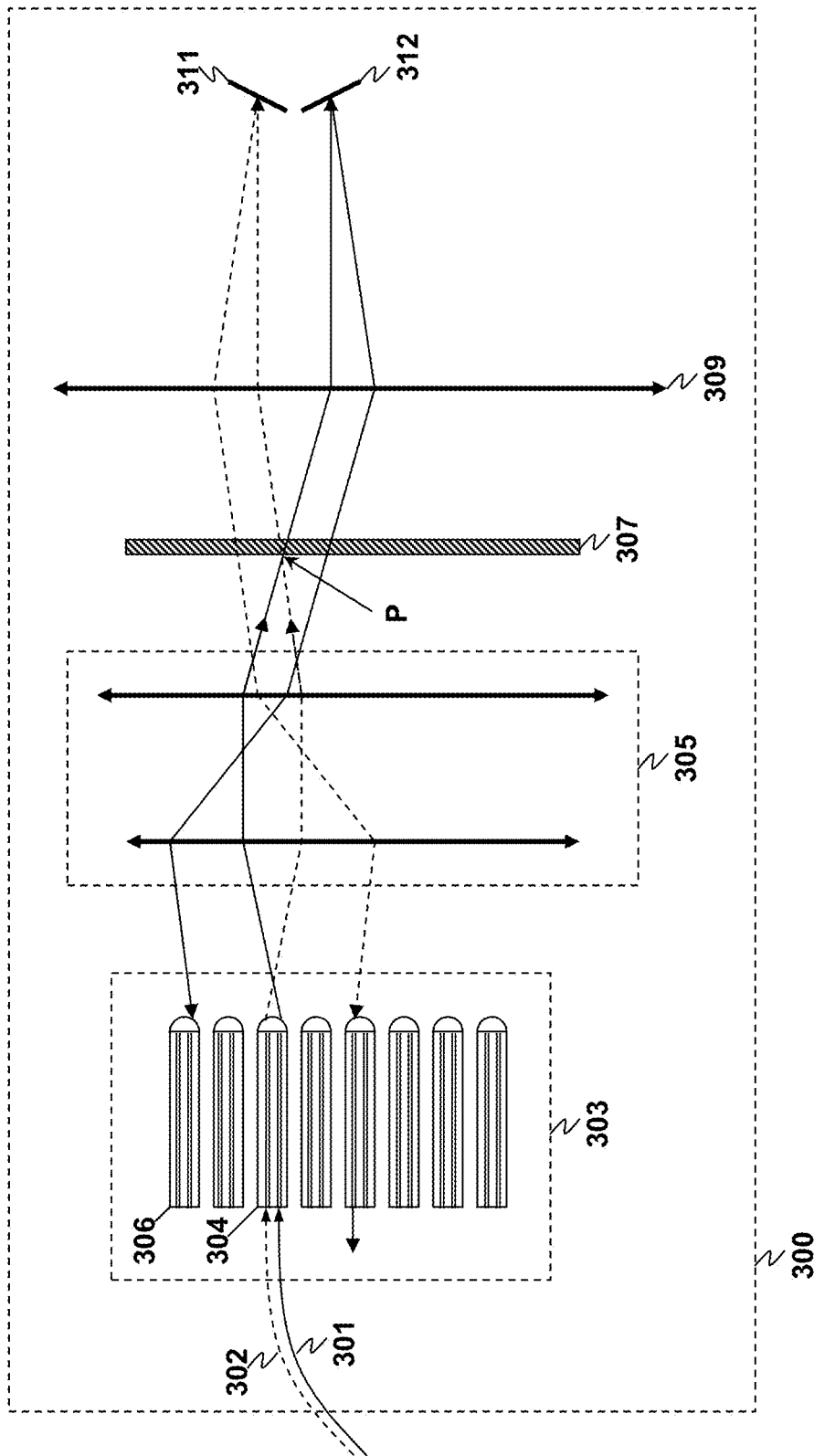
FIG. 3B is a cross-sectional view schematic diagram illustrating an example of a wavelength switch system employing angle-multiplexing according to an embodiment of the present invention.

FIGS. 3A-3B are schematic diagrams illustrating a wavelength switch system using angle multiplexing optics according to an embodiment of the present invention. FIG. 3A illustrates a top view of the WSS, while FIG. 3B provides a cross-sectional view of the same WSS. The WSS 300 comprises a collimator array 303, relay optics 305, a wavelength separator 307, focusing optics 309, and two deflector arrays 311, 312. The collimator array 303 may be made up of a plurality of collimator elements 304. Each collimator element 304 in the collimator array 301 may be configured to receive and transmit two or more multi-channel optical signals 301, 302 simultaneously over different optical paths corresponding to two or more different ports. The different optical paths may be implemented, e.g., using optical fibers or optical waveguides. For purposes of illustration, only two total multi-channel optical signals 301, 302 are being switched by the WSS 300 in our example. It is important to note that each input/output collimator may be configured to receive and transmit more than two multi-channel optical signals simultaneously.

By way of example, and not by way of limitation, each collimator element 304 may include a lens. Inbound multi-channel optical signals can be guided to the lens by different optical paths configured such that the lens deflects the optical signals at different angles. If the optical behavior of the lens is reversible, the collimator element 304 can likewise couple outbound optical signals incident on the lens at different angles to different optical paths.

Referring to FIG. 3B, a collimator 304 may receive two inbound multi-channel optical signals 301, 302. The collimator 304 is configured to direct these two multi-channel optical signals 301, 302 towards the relay optics 305 at different angles. The angles at which these two multi-channel optical signals 301, 302 leave the input port 304 can depend on the overall objectives of the WSS 300 and may vary from one WSS to another. The relay optics 305 then take each multi-channel optical signal 301, 302 and converts them into a corresponding spectral beam while simultaneously transforming different angles at which each signal exits the collimator 304 into different angles at which each beam is incident on the wavelength separator 307. Each spectral beam, which corresponds to a multi-channel optical signal, will meet the wavelength separator 307 at the same point P, albeit at different angles. If the wavelength separator 307 is positioned at the focal plane of the focusing optics 309, the two spectral beams will behave in accordance with the basic foundations of optical design discussed above (i.e., they will exit the focusing optics in parallel).

The first multi-channel optical signal 301, represented by a solid line, is directed by the focusing optics 309 towards an array of channel deflective elements 312, which will hereinafter be referred to as deflector array B. The focusing optics 309 direct the second multi-channel optical signal 302, represented by the dotted line, towards a second array of channel deflective elements 312, which will hereinafter be referred to as deflector array A. The deflector arrays 311, 312 can then redirect the constituent channels towards an output port in a different collimator element 306 depending on the requirements of the WSS 300. By way of example, and not by way of limitation, the deflector elements in the deflector arrays may be microelectromechanical systems (MEMS) mirrors. However, embodiments of the present invention are not limited to implementations that utilize MEMS mirrors, alternatively, other types of deflector elements such as liquid crystal on silicon (LCOS) devices may be used. The deflector arrays 311, 312 can be oriented at an angle with respect to each other to accommodate different incident angles of the first and second optical signals 301, 302 on the arrays due to the different incident angles of the first and second optical signals 301, 302 on the wavelength separator 307.

It should be clear that each deflector array 311, 312 can function independently without affecting the other, because of their vertical arrangement within the WSS 300. Therefore, several optical signals (and thus several optical switching systems) may occupy the same physical space without interfering with each other. Specifically, by way of example, and not by way of limitation, embodiments of the present invention include implementations that allow two or more independent 1×N wavelength selective switches to be made in the same form factor as one 1×N wavelength selective switch. Whereas prior art required an increase in the number of collimators, and therefore an increase in the size of the optical components, embodiments of the present invention can take advantage of existing optical switch configurations. Embodiments of the present invention makes more economical use of each collimator, by allowing each collimator to receive and transmit more than one multi-channel optical signal. In other words, each collimator can accommodate more than one port. This in turn allows most of the optical components (i.e., relay optics, wavelength separator, and focusing optics) in the optical system to remain unaltered, minimizing the costs associated with switching a greater number of signals. While embodiments of the present invention might require an additional deflector array for each additional multi-channel optical signal being transmitted by a single collimator element, the overall cost of switching additional multi-channel optical signals can be reduced because most of the optical components used for the switching process, e.g., the relay optics, wavelength separator, and focusing optics, can be the same as in a conventional switch.

A concern associated with this type of angle-multiplexed WSS is that cross talk (or isolation) may occur between the two or more multi-channel optical signals. However, by controlling the angular separation between the multi-channel optical signals when they come in contact with the wavelength separator, cross talk may be easily kept below 40 dB.

Figure 4C:
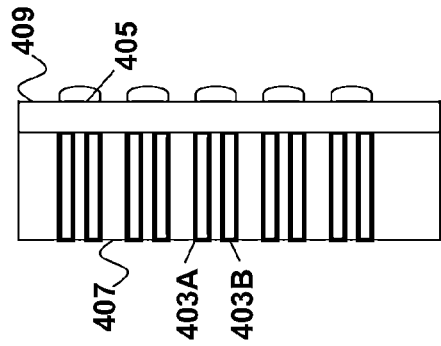
FIG. 4C is a side-view schematic diagram illustrating an array of ports configured for angle-multiplexing according to an embodiment of the present invention.
Figure 4D:
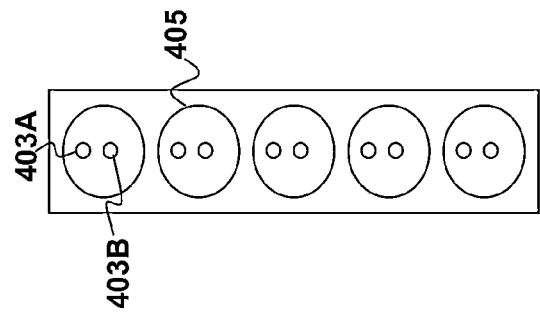
FIG. 4D is an axial view schematic diagram illustrating an array of ports configured for angle-multiplexing according to an embodiment of the present invention.
Figure 4A:
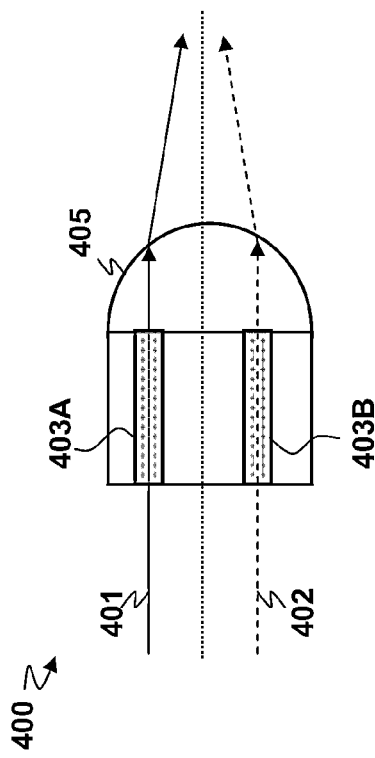
FIG. 4A is a side-view schematic diagram illustrating an input port configured for angle-multiplexing according to an embodiment of the present invention.
Figure 4B:
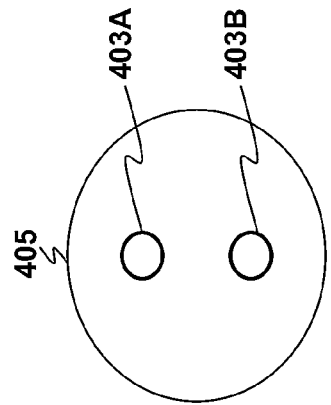
FIG. 4B is an axial view schematic diagram illustrating an input port configured for angle-multiplexing according to an embodiment of the present invention.

FIGS. 4A-4B illustrate an example of how a single input collimator may be configured to receive and transmit two or more multi-channel optical signals via different optical paths. FIG. 4A illustrates a cross-sectional view of a multi-port collimator 400, while FIG. 4B illustrates an axial view of the collimator 400. By way of example, and not by way of limitation, a single collimator element may be configured to receive and transmit two multi-channel optical signals 401, 402 by positioning two separate waveguides 403A, 403B in front of a single lens 405. In this example, the waveguide paths 403A, 403B may be parallel to each other and parallel to an optical axis of the lens 405. In this example, the two waveguide paths 403A, 403B are offset with respect to each other. Each of the waveguide paths 403A, 403B directs its corresponding input multi-channel optical signal 401, 402 in parallel directions but towards different points on the lens 405. If the offset distance between the two waveguide paths is sufficiently large, the cross-talk between the two signals 401, 403 may be kept below about 40 dB. By way of example, and not by way of limitation, two waveguides that share the same lens can be offset by a separation distance that is about 2 times the width of the waveguide paths. For example, a typical waveguide width is on the order of 8 μm. In this case, the center-to-center distance between the two waveguides should be 16 μm or greater. It is important to note that an output port may also be configured to receive and transmit more than one multi-channel optical signal in a similar manner. It is noted that embodiments of the present invention include implementations in which a single collimator element can accommodate three or more ports for optical signals. As such, collimator elements in embodiments of the present invention are not limited to the configurations shown in FIGS. 4A-4D.

In alternative embodiments, each of the waveguide paths 403A, 403B could direct its corresponding input multi-channel optical signal towards the same point of the lens 405, but at different angles. In other alternative embodiments, the waveguide paths 403A, 403B could direct the optical signals 401, 402 toward different points on the lens 405 and at different angles.

While FIG. 4A-4B illustrate the configuration of a single input port, multiple input ports and output ports could be constructed using a similar setup as illustrated in FIG. 4C-4D. FIG. 4C provides a cross-sectional view of an array of input ports and output ports, wherein each port is configured to transmit and receive two multi-channel optical signals. FIG. 4D provides an axial view of that same array. A waveguide array 407 could be positioned in front of a lens array 409, such that two or more waveguides 403 are configured to direct their multi-channel optical signals toward the same lens 405. In the embodiment illustrated in FIGS. 4A-4B, each pair of waveguides 403 can share a single lens 405. The waveguide array (WGA) 407 could be implemented using planar lightwave circuit (PLC) technology which utilizes wafer processing techniques to form regular and repeatable patterns defined by photolithography. Using lithography, the spacing between the waveguide pairs can be matched precisely with the spacing of the lens array 409. Since the focal length of the lens array 409 can be made with extreme precision, the angular difference between the two or more groups of light exiting the collimator may also be very precisely controlled.

FIG. 3B illustrated an example of switching two multi-channel optical signals to different output ports. However, there may be times when it is necessary to couple the two different multi-channel optical signals into the same output port (i.e., cross-coupling). Using only the two deflector arrays 311, 312 provided in FIG. 3B to cross-couple two multi-channel optical signals might not be very straightforward, and thus additional optical components may need to be introduced to facilitate this process.

It is noted that the different waveguide paths for each collimator in the array 303 can be thought of as belonging to two different groups of optical ports. For example, the upper port in each collimator element may be thought of as belonging to one port group and the lower port in each collimator element may be thought of as belonging to a different port group. In the switch configuration shown in FIGS. 3A-3B, signals from a port in one port group can be coupled via a corresponding deflector array to any other port in the same port group. The switch of FIGS. 3A-3B may be modified to accommodate cross-coupling of optical signals between the different port groups.

Figure 5A:
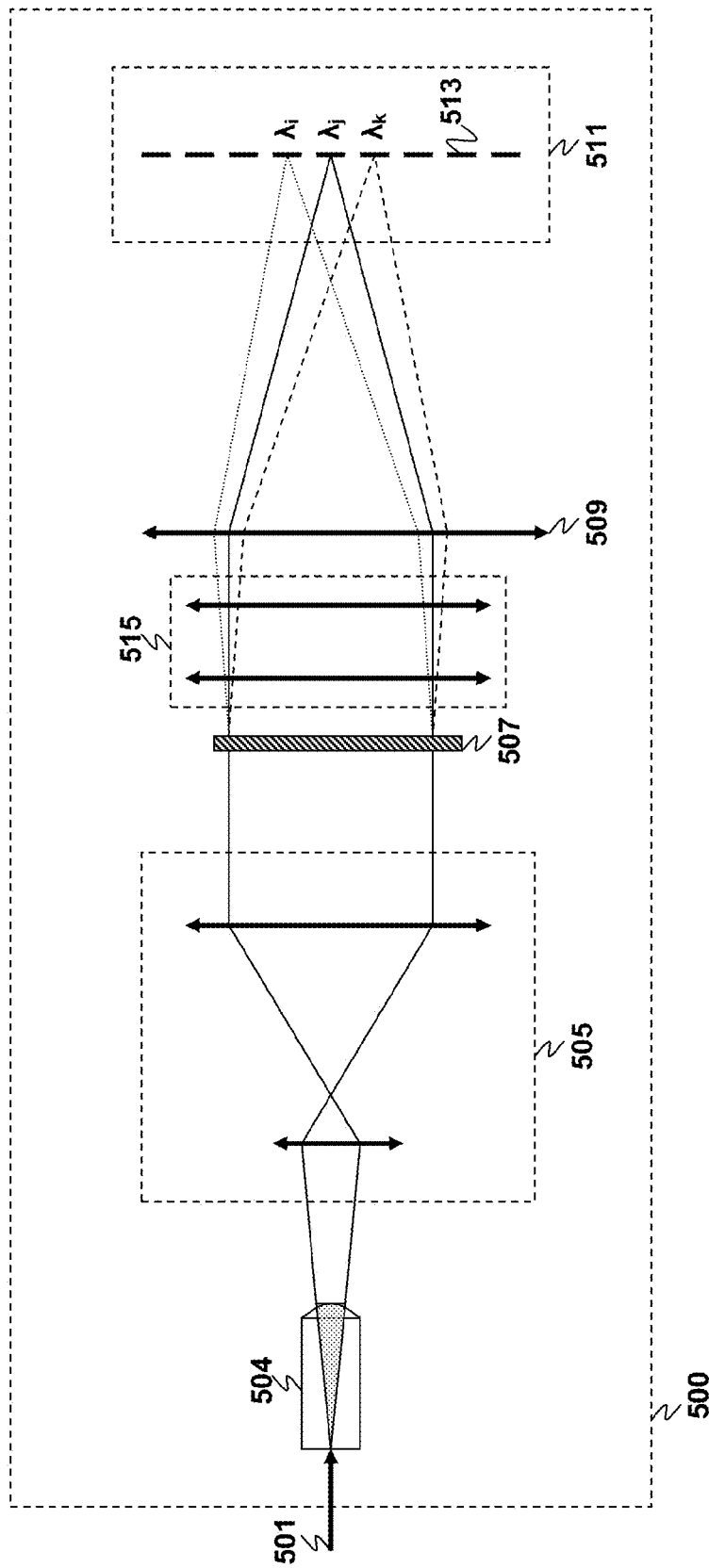
FIG. 5A is a top-view schematic diagram illustrating a wavelength switch system employing angle-multiplexing and angle exchange according to an embodiment of the present invention.
Figure 5B:
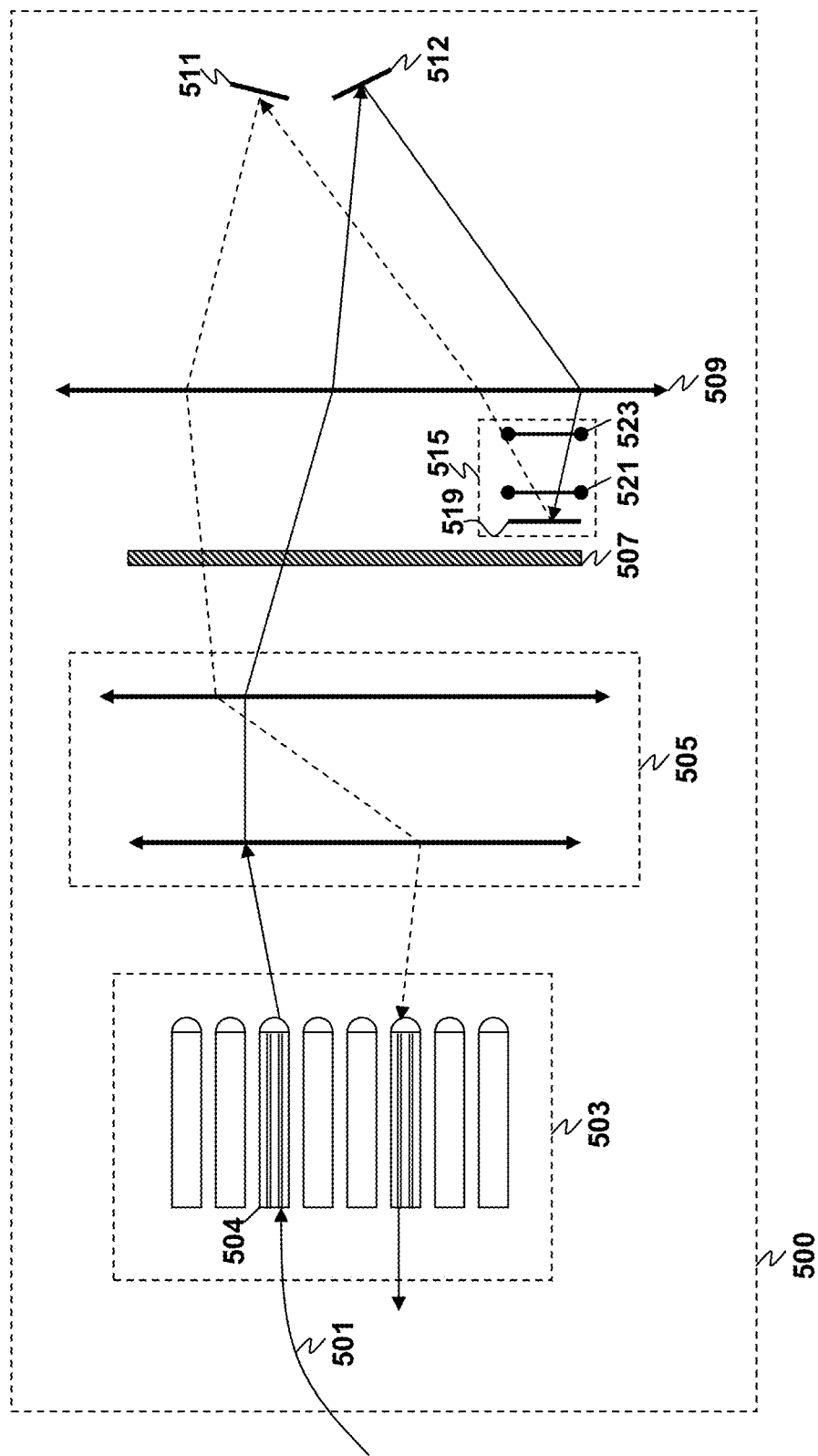
FIG. 5B is a cross-sectional view schematic diagram illustrating a wavelength switch system employing angle-multiplexing and angle exchange according to an embodiment of the present invention.

FIGS. 5A and 5B are schematic diagrams illustrating a WSS that employs angled-multiplexing and cross-coupling according to an embodiment of the present invention. As used herein, the term cross-coupling refers to coupling of signals from two different input ports to the same output port. FIG. 5A illustrates a top-view of a WSS 500 according to an alternative embodiment of the invention, while FIG. 5B presents a cross-sectional view of the same WSS. Rather than directing each multi-channel optical signal to a different set of output ports, this embodiment is set up such that multi-channel optical signals may be cross-coupled using angular exchange. For purposes of our example, we will illustrate how a single multi-channel optical signal 501 can be redirected from deflector array B 512 to deflector array A 511. Once the multi-channel optical signal 501 is redirected to deflector array A 511, it may then become coupled with a multi-channel optical signal that was initially directed towards deflector array A (not shown for purposes of illustration).

The WSS 500 comprises an array 503 of collimator elements 504, a set of relay optics 505, a wavelength separator 507, focusing optics 509, and two arrays of channel deflective elements 511, 512. These optical components are configured to switch one or more multi-channel optical signals to their respective output ports in a manner similar to that described above with respect to FIGS. 3A-3B. In addition to the optical components just described, the WSS 500 also includes an additional one-dimensional (1-D) reflector 515 to facilitate cross-coupling. The 1-D reflector 515 is inserted along an optical path between the wavelength separator 507 and the focusing optics 515. The 1-D reflector 515 includes one mirror 519 and two cylinder lenses 521, 523. The two cylinder lenses 521, 523 are configured to focus in a direction perpendicular to the plane of the drawing in FIG. 5B and do not focus in the vertical direction in FIG. 5B. For convenience, the cylinder lens closest to the focusing optics will be referred to herein as the $1^{st}$ cylinder lens 523. The cylinder lens situated between the mirror 519 and the $1^{st}$ cylinder lens 523 will be referred to herein as the $2^{nd}$ cylinder lens 521.

The $1^{st}$ cylinder lens 523 combines with the focusing optics 509 to form one effective lens. This effective lens and the $2^{nd}$ cylinder lens 521 are optically coupled to form a 4f optical system. As is well known, in a typical 4f optical system, two lenses of equal focal length f are separated from each other by a distance 2f. An input plane is located a distance f from one of the lenses and an output plane is located a distance f from the other lens on the opposite side. In FIG. 5B, the input plane could be located at deflector array A 511 or deflector array B 512 and the output plane could be located at the mirror 519 in the 1-D reflector. It is noted that the input and output planes could be reversed due to the reversible nature of optical signals. In this example, the $1^{st}$ cylinder lens 523 and the focusing optics have an effective focal length f and the second cylinder lens 521 has a focal length of f. Strictly speaking, a 4f system does not require that the focal lengths of the two lenses to be equal. If the two lenses 521, 523 have different focal lengths f1 and f2, a 4f optical system may be implemented if the lenses are configured such that the distance between the lenses is f1+f2 and the input/output planes are located at f1 and f2 respectively.

From the top view, if deflector array B 512 reflects light back along the optical axis, the 4f system will return the light back to the same position. However, from the side view of FIG. 5B, it can be seen that deflector array B 512 is actually oriented downwards. In the vertical direction of the drawing in FIG. 5B there are no optical focusing effects on light that passes through the cylinder lenses 521, 523, and so when light is reflected by deflector array B 512, the angle is changed. Because of the angle-position transform produced by the focusing optics 509, the change in angle will cause the light to be directed towards the 1-D reflector mirror 519, which will then focus the light at deflector array A 511. All light reflected by deflector array B 512 will be coupled with any groups of light initially directed at deflector array A 511. Thus, the 1-D retro reflector 515 provides a mechanism for angle exchange (AE).

Figure 5C:
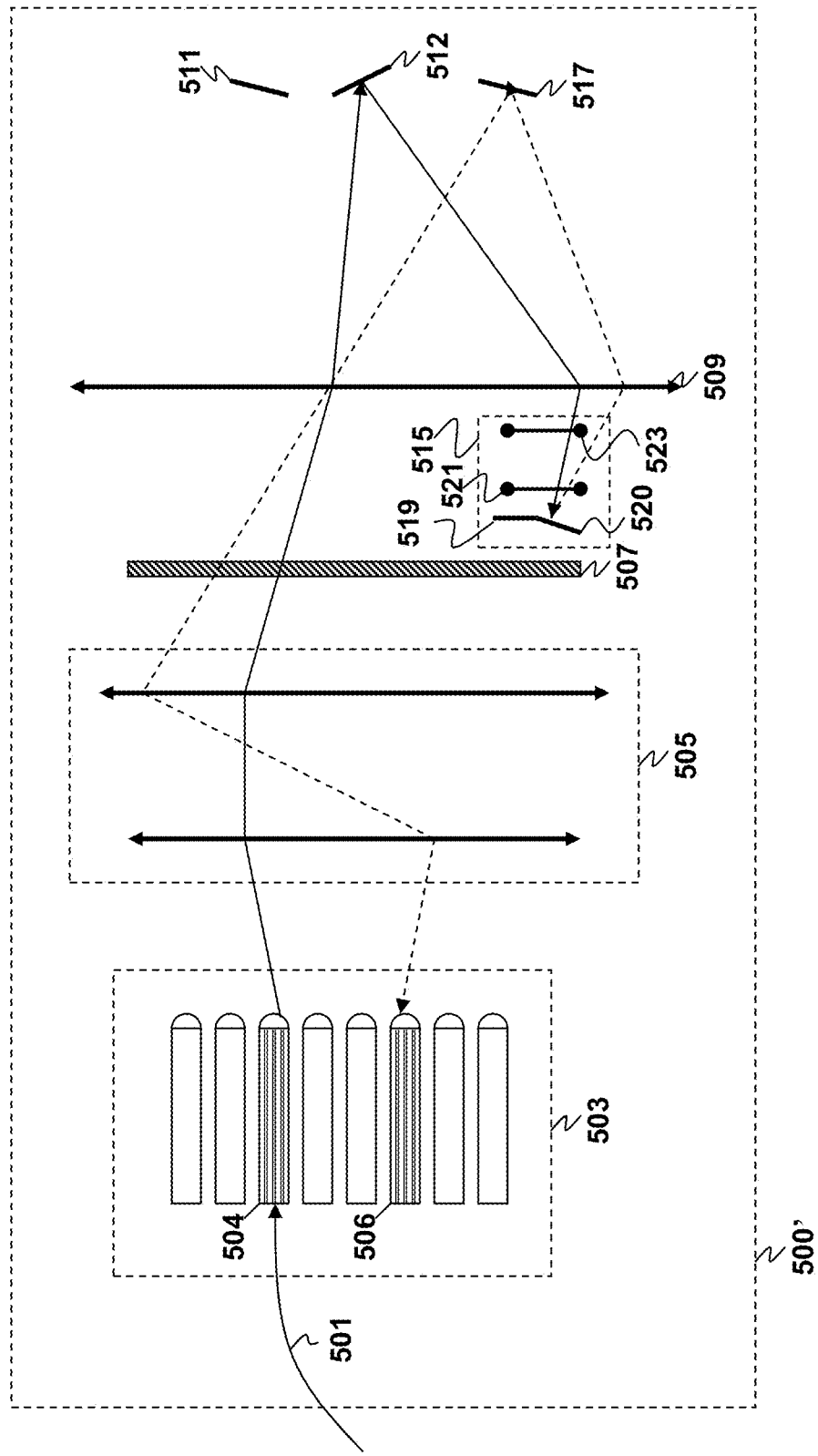
FIG. 5C is a cross-sectional view schematic diagram illustrating a wavelength switch system employing angle-multiplexing and angle exchange according to another embodiment of the present invention.

This angle exchange concept can be extended for systems configured to receive/transmit more than two multi-channel optical signals per collimator element 504. This is illustrated in FIG. 5C, where the WSS 500' is configured to switch three multi-channel optical signals per input collimator element 504 using three arrays of deflective elements 511, 512, 517. A third deflector array 517, herein referred to as deflector array C 517 is introduced to facilitate switching of the third multi-channel optical signal associated with the input port. For purposes of illustration, only one multi-channel optical signal 501 is shown to describe the angular exchange between three deflector arrays 511, 512, 517. An additional mirror 520 is placed in the 1-D retro reflector 515' to facilitate angle exchange of light between deflector array B 512 and deflector array C 517. The 1-D retro reflector 515' behaves in the same manner as described above with respect to cross-coupling light deflected by deflector array A 511 and deflector array B 512. The additional mirror 520 is angled with respect to mirror 519 to facilitate cross-coupling of light reflected from deflector array B 512 with any groups of light initially directed at deflector array C 517.

In some embodiments of the invention, the WSS 500 may be configured to allow for cross-coupling between deflector array A 511 and deflector array C 517. The choice of whether the optical signal 501 hits mirror 519 or additional mirror 520 depends on the angle of deflector array B 512. If the angle of deflector array B 512 is adjusted slightly, the light can hit mirror 519 so that the angle of return light is altered so that by design the optical signal could return to deflector array A 511.

It is important to note that this concept of angle exchange illustrated in FIGS. 5A-5C may be adapted for any number of multi-channel optical signals and any number of arrays of channel deflective elements.

It is also noted that the WSS 500 can be configured to avoid cross-coupling between deflector arrays when this is not desired. For example, undesired cross-coupling may be avoided if the 1D reflectors 519, 520 occupy a space that does not change the traditional 1×N WSS function. The 1D reflectors 519, 520 could be located one channel space between the original optical path or the number of ports may be reduced by one compared to the original WSS design. Thus, the optical signal 501 could be made to stay in its own deflector array or the return beam could be moved to a 1D reflector to cause the channel to change to a different deflector array. Each mirror 519,520 can be configured to cause one kind of exchange of the signal from deflector array B 512 to deflector array C 517. Additional space allows for another mirror (tilted at different angle) to provide for exchange between deflector array B 512 and deflector array A 511.

Angle multiplexing and angle exchange provide WSS with significant advantages over the prior art in the areas of optical switching capacity and cross-coupling. They allow several multi-channel optical signals to share optical components, which reduce the costs associated with making additional optical components. They also allow several multi-channel optical signals to share the same physical space, thus reducing the overall size of the WSS as well as costs associated with expansion. Additionally, the ability to reduce the component count of a WSS leads to higher overall reliability.

Figure 6A:
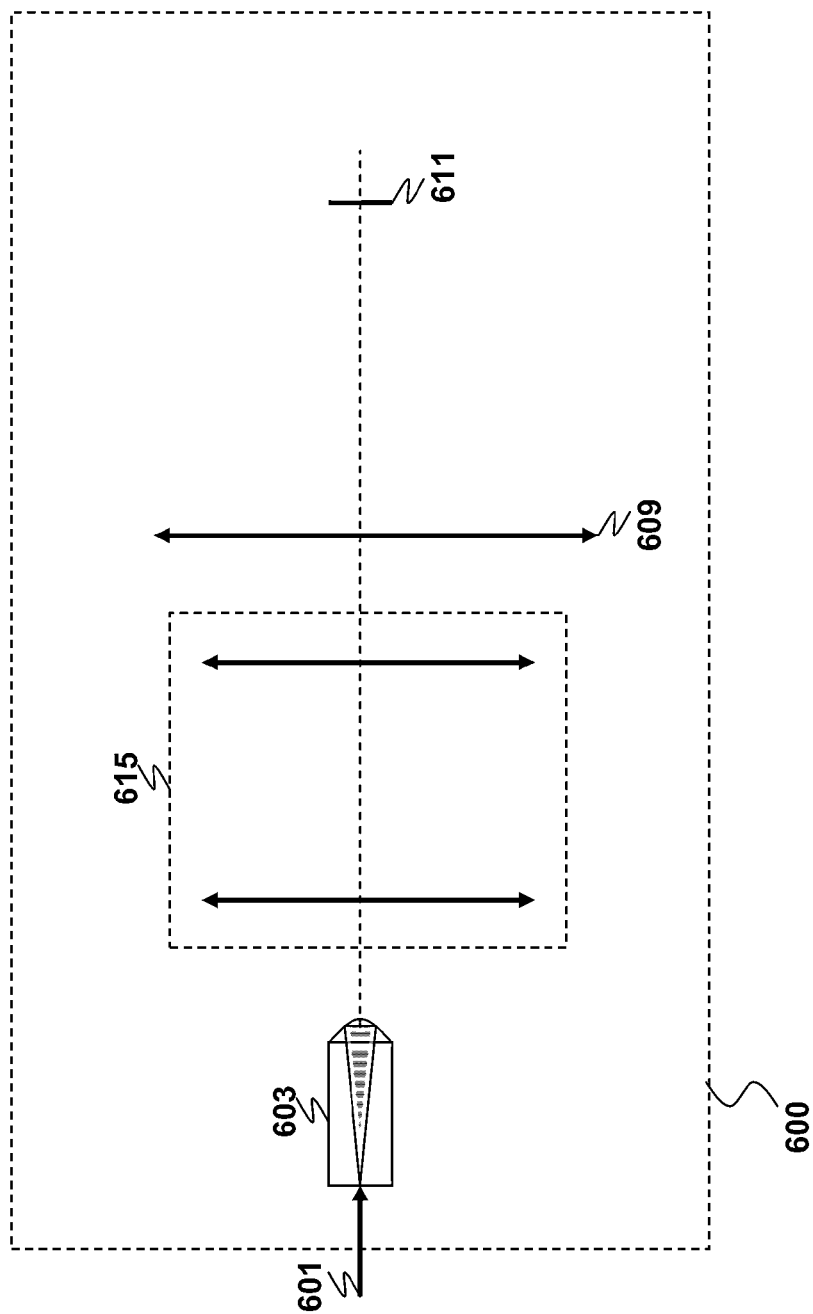
FIG. 6A is a top-view schematic diagram illustrating a fiber switch employing angle-multiplexing and angle exchange according to an embodiment of the present invention
Figure 6B:
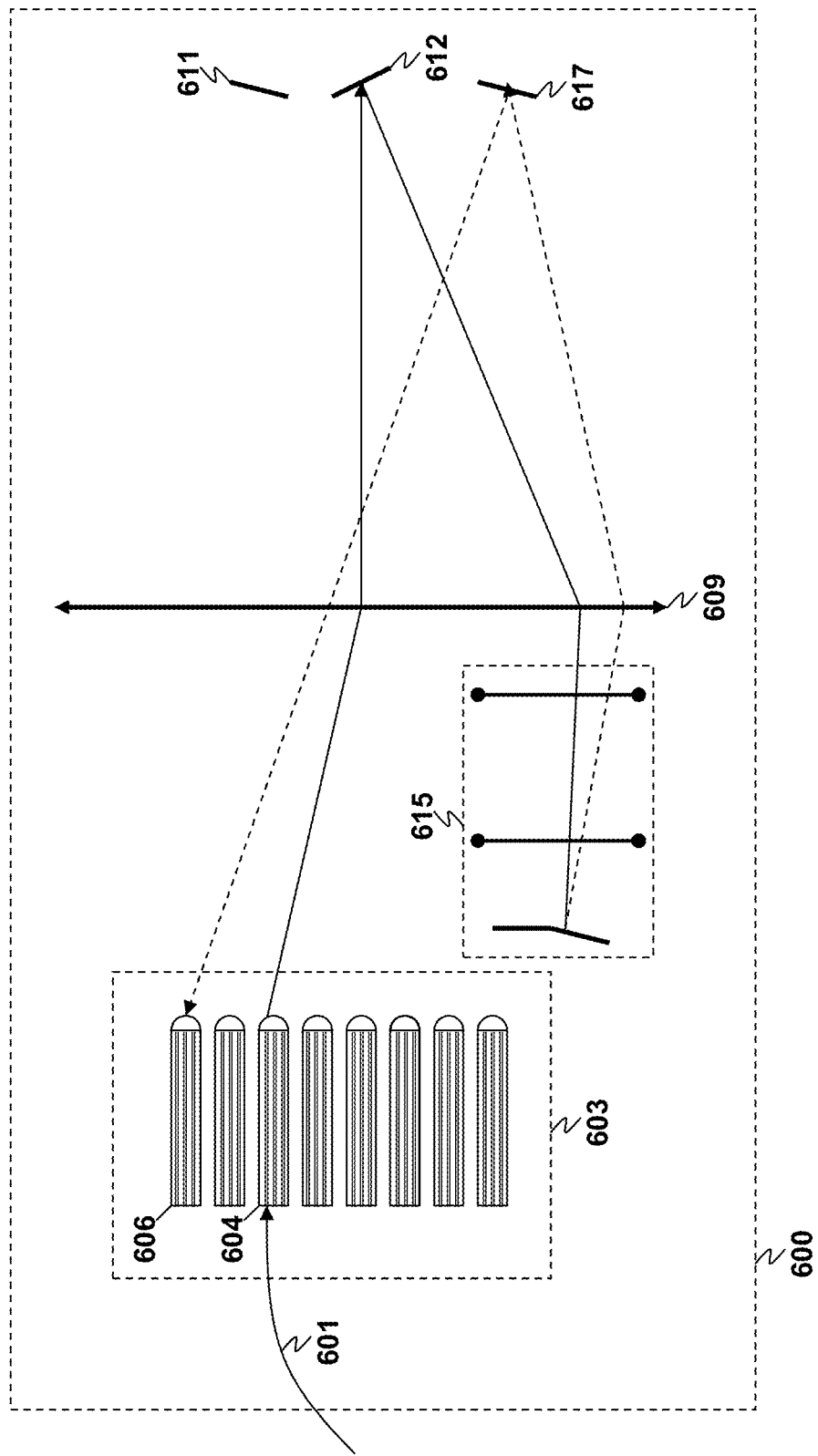
FIG. 6B is a cross-sectional view schematic diagram illustrating a fiber switch employing angle-multiplexing and angle exchange according to an embodiment of the present invention.

While the primary application of angle-multiplexing optics and angular exchange involves wavelength switch systems, these concepts may also be applied to fiber switches as illustrated in FIG. 6A-B. FIG. 6A illustrates a top view of a fiber switch employing angle-multiplexing and angular exchange. FIG. 6B illustrates the cross-sectional view of the same optical switch. The switch 600 includes of a collimator array 603, a 1-D retro reflector 615, focusing optics 609 and three deflectors 611, 612, 617. These three deflector will be referred to herein as deflector A 611, deflector B 612, and deflector C 617. By way of example, and not by way of limitation, the deflectors 611, 612, 617 may include moveable mirrors, e.g., MEMS mirrors that can pivot about one or more axes to provide a desired optical coupling between different ports within a given port group in the collimator array 603.

The collimator array 603 is comprised of multiple collimator elements 604, 606 that are configured to receive and transmit optical signals. Each collimator element 604, 606 may be configured to receive two or more optical signals via different ports as described above. In the example shown in FIG. 6, each collimator element 604, 606 is configured to receive and transmit three optical signals at a given time. However, for purposes of illustration, only a single optical signal 601 will be shown to pass through the fiber switch 600. Once an input port in a first collimator element 604 has received the optical signal 601, it will direct that optical signal 601 towards a set of focusing optics 609.

The focusing optics 609 then direct the optical signal 601 towards a deflector, dependent on the configuration of the switch 600. As shown in the example illustrated, in FIG. 6B, the focusing optics 609 can be configured to direct the optical signal 601 towards deflector B 612. While WSS employ deflector arrays to redirect individual channels (i.e., wavelengths) of each multi-channel optical signal, the fiber switch 600 can be implemented with individual deflector elements to redirect an entire multi-channel optical signal without first separating the optical signal into its constituent channels. Deflector B 612 can be oriented to direct the optical signal 601 towards the 1-D retro reflector 615. The 1-D retro reflector 615 comprises two cylinder lenses and a mirror, and behaves as described above (i.e., it redirects light incident on it towards another mirror for cross-coupling). The two cylinder lenses and the focusing optics 609 can be configured to form a 4f optical system, e.g., as described above. In our example, the fiber switch 600 is arranged such that the 1-D retro reflector 615 redirects the optical signal from deflector B 612 to deflector C 617. The effect of this angular exchange is to cross couple the optical signal reflected by mirror B 612 with any optical signals initially incident on deflector C 617. It is important to note that angular exchange could be implemented between any number of combinations of deflector arrays.

While the above is a complete description of the preferred embodiment of the present invention, it is possible to use various alternatives, modifications, and equivalents. Therefore, the scope of the present invention should be determined not with reference to the above description, but should, instead, be determined with reference to the appended claims, along with their full scope of equivalents. Any feature described herein, whether preferred or not, may be combined with any other feature described herein, whether preferred or not. In the claims that follow, the indefinite article "A" or "An" refers to a quantity of one or more of the item following the article, except where expressly stated otherwise. The appended claims are not to be interpreted as including means-plus-function limitations, unless such a limitation is explicitly received in a given claim using the phrase "means for".

What is claimed is:

1. A wavelength switch system for dynamic switching of multi-channel optical signals having spectral channels of different wavelengths, comprising:
   a) a plurality of collimator elements for optical signals having one or more of said spectral channels, each collimator element having two or more separate optical paths for optical ports configured to receive and transmit two or more corresponding independent optical signals at a time, whereby each collimator element accommodates two or more optical ports, whereby there are a plurality of ports that includes two or more corresponding distinct groups of optical ports;
   b) a wavelength separator configured to separate multi-channel optical signal from a given port in the plurality of ports into a corresponding group of constituent spectral channels;
   c) relay optics optically coupled between the plurality of collimator elements and the wavelength separator, wherein the relay optics are configured to direct optical signals originating from different ports in a given collimator element towards a common point on the wavelength separator but at different angles; and d) two or more independent arrays of channel deflection elements optically coupled to the wavelength separator, wherein each array of channel deflection elements is configured to selectively direct a group of spectral channels corresponding to one of the two or more optical signals originating from a given port in a given group of the two or more distinct groups of optical ports toward a different one or more selected ports in the given group of optical ports.

2. The system of claim 1 wherein two or more of the arrays of channel deflection elements are oriented at an angle with respect to each other to accommodate coupling of optical signals incident on the wavelength separator at different angles to respectively different arrays of channel deflection elements.

3. The system of claim 1, wherein each collimator element in the plurality of collimator elements includes two or more waveguides and a single lens optically coupled to the two or more waveguides, wherein the two or more waveguides are separated by a fixed offset.

4. The system of claim 3 wherein the two or more waveguides are substantially parallel to each other.

5. The system of claim 4 wherein the fixed offset is about 2 times a width of the waveguides.

6. The system of claim 1, wherein the wavelength separator includes an interference filter, a polarizing filter, an arrayed waveguide grating, a prism, or a diffraction grating.

7. The system of claim 1, wherein the channel deflection elements of the two or more arrays include microelectromechanical system (MEMS) mirrors, liquid crystal on silicon (LCOS) devices, bi-stable liquid crystals, UV curable optical mediums, or photorefractive holographic gratings.

8. The system of claim 1, further comprising redirection optics configured to receive the group of spectral channels emanating from one of the two or more arrays of channel deflection elements and redirect said group of spectral channels towards another one of the two or more arrays of channel deflection elements.

9. The system of claim 8, wherein the redirection optics include two cylindrical lenses coupled to one or more redirection mirrors.

10. The system of claim 9, further comprising focusing optics optically coupled between the wavelength separator and the arrays of channel deflection elements and between the arrays of channel deflection elements and the redirection optics, the wherein the two cylindrical lenses and focusing optics are configured to form a 4f optical system.

* * * * *